United States Patent [19]

Liautaud et al.

[11] Patent Number: 4,585,197
[45] Date of Patent: Apr. 29, 1986

[54] SWIVEL BASE ASSEMBLY

[75] Inventors: James P. Liautaud, Cary; John K. Westberg, II; Peter F. Stultz, both of Elgin, all of Ill.

[73] Assignee: James P. Liautaud, Cary, Ill.

[21] Appl. No.: 529,958

[22] Filed: Sep. 6, 1983

[51] Int. Cl.⁴ ............................................. F16M 11/14
[52] U.S. Cl. .................................. 248/349; 248/288.5; 248/309.4; 248/181; 403/89; 403/224
[58] Field of Search ............... 248/349, 346, 664, 560, 248/575, 561, 483, 481, 288.5, 309.4, 181; 403/90, 89, 131, 224

[56] References Cited

U.S. PATENT DOCUMENTS

| 1,333,432 | 3/1920 | Maier | 403/90 X |
| 1,464,308 | 8/1923 | Copony et al. | 403/131 X |
| 1,749,868 | 3/1930 | Anderson | 248/483 |
| 2,580,099 | 12/1951 | Jaeger | 248/206.5 X |
| 2,634,935 | 4/1953 | Carpenter | 403/90 X |
| 2,890,010 | 6/1959 | Barkheimer | 248/404 X |
| 3,936,026 | 2/1976 | Hampel et al. | 248/425 X |
| 3,958,904 | 5/1976 | Rusbach | 403/90 |
| 4,066,231 | 1/1978 | Bahner et al. | 248/552 X |

FOREIGN PATENT DOCUMENTS 3232 of 1882 United Kingdom ............... 248/181

Primary Examiner—Ramon S. Britts
Assistant Examiner—Karen J. Chotkowski
Attorney, Agent, or Firm—Lockwood, Alex, FitzGibbon & Cummings

[57] ABSTRACT

A swivel base assembly for mounting radio apparatus or the like on a supporting surface includes a first support element for engaging the apparatus housing and a second support element for engaging the supporting surface. A spacing element in the form of a sphere allows relative movement between the support elements while maintaining a fixed minimum spacing. Locking means in the form of interlocking hook members draw the mounting plates into engagement with the spacer element to fixedly position the first plate with respect to the second plate and the supporting surface.

8 Claims, 10 Drawing Figures

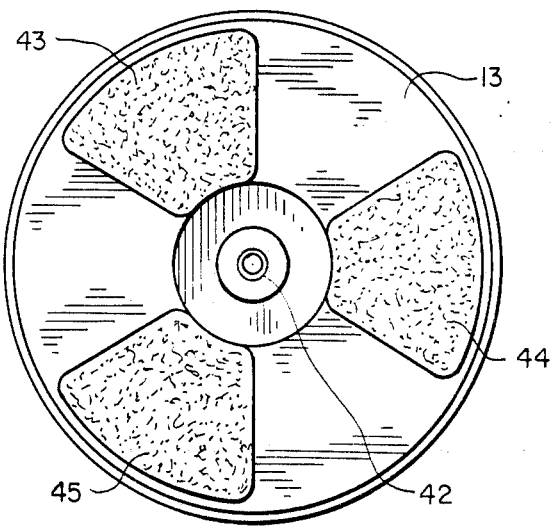
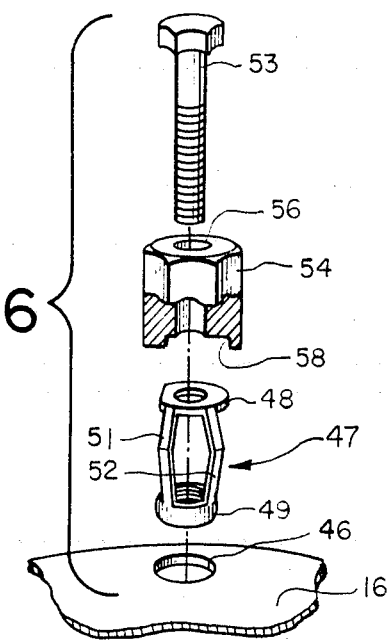
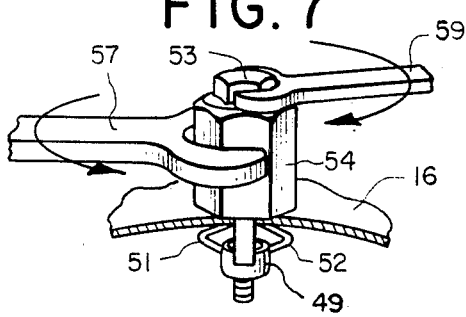
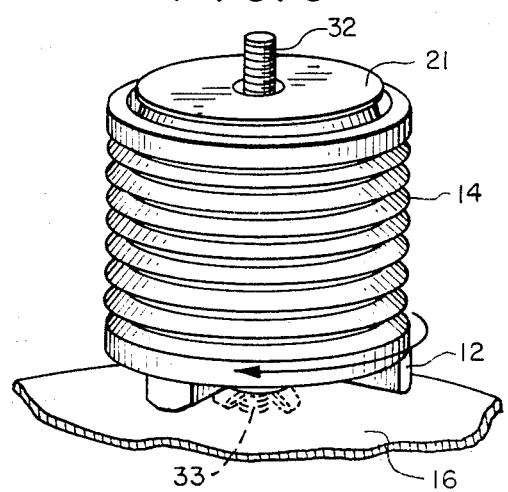
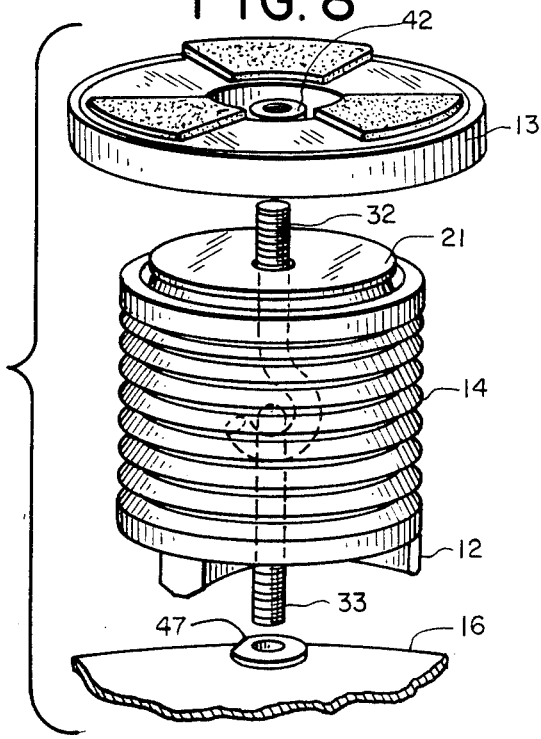
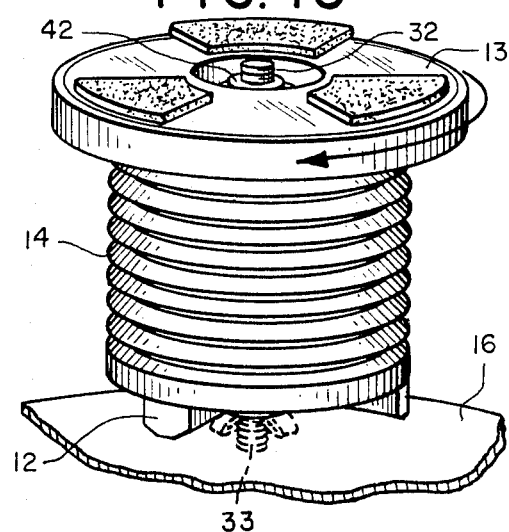

SWIVEL BASE ASSEMBLY

BACKGROUND OF THE INVENTION

This invention relates generally to apparatus for mounting radios, tape players or other electronic equipment to the floor or transmission hump of an automobile or other surface. More specifically, this invention relates to a swivel base assembly for radios or other electronic equipment wherein the equipment can be held firmly in a variety of user-selected positions, and can be quickly and easily detached from the mounting unit for removal from the automobile.

Electronic equipment is frequently installed in automobiles in order to furnish communication or entertainment to the occupants thereof. Normally, such electronic equipment is physically mounted in the passenger compartment within easy reach of the driver and front seat passenger, and the top surface of the transmission hump frequently provides a suitable and convenient surface on which to mount the equipment. A variety of mounting devices have been developed for attaching electronic equipment to the transmission hump or floor of an automobile.

One requirement of such mounting devices is that the device hold the radio firmly and securely, even when the automobile is subjected to substantial jarring and vibration. Furthermore, since electronic equipment for performing communications and entertainment functions is frequently provided with numerous control buttons, dials and the like, it is desirable that the equipment be positioned so that the controls may be easily manipulated by the user while he is driving or riding in the car. Consequently, a mounting device should allow the user to position the electronic equipment so that he can easily operate the various controls without substantially altering his normal driving position. Since the optimum position in which to mount the unit varies with each individual user and type of vehicle, the mounting device should be capable of providing a wide range of mounting positions.

The mounting system should require minimal alteration of the automobile passenger compartment. The number of holes required to be drilled through the sheet metal of the automobile should be minimized, and provision should be made enabling remova of the mounting system from the automobile while leaving little evidence that such a system was ever installed. Furthermore, since two way radios and other electronic equipment are frequently the subject of theft, it is desirable that such equipment be easily and quickly removable from the mounting system so that it can be stored out-of-sight within the truck of the automobile or carried from the automobile for storage elsewhere. Since it may be necessary to install and remove the equipment from the automobile several times in the course of a day, it is desirable that the equipment be attached and detached from the mounting unit in a quick and simple manner. Finally, it is desirable that the mounting unit be easily and economically manufactured from inexpensive materials so as to minimize its cost.

At the present time two techniques are generally being used for mounting radios or other electronic equipment to the floor or hump of an automobile. The first technique uses a ball and socket assembly with a threaded screw and wing nut for locking the equipment in a desired position. The second techique uses two split halves which are serrated and held together by a screw and nut assembly. The nut is tightened when the unit is in the desired position in order to lock the unit to that position. Both systems suffer the disadvantages of being cumbersome, providing limited movement, and involving substantial expense.

Accordingly, it is a general object of the present invention to provide a mounting system wherein a radio or other electronic equipment may be firmly and securely attached to an interior surface of an automobile passenger compartment.

It is a further object of the present invention to provide a mounting system wherein a radio or other electronic equipment may be held firmly in a wide variety of user-selected positions.

Still another object of the present invention is to provide a mounting system involving minimal permanent alteration of the passenger compartment and which allows the radio or other unit to be quickly and easily installed and removed from the automobile.

Still another object of the present invention is to provide a mounting system which can be easily and economically manufactured.

SUMMARY OF THE INVENTION

A swivel base assembly for mounting electronic apparatus or the like on a supporting surface includes a spacer element, a first plate adapted to engage the spacer element from one side, this first plate including means for receiving the apparatus in supporting relationship, and a second plate adapted to engage the spacer element from the other side, this second plate including mean for attachment to the supporting surface. Retaining means retain the first and second plates in operative engagement with the spacer element so that the plates are movable with respect to each other, and locking means draw the first and second plates together into engagement with the spacer element, so that the plates are fixedly positioned relative to each other and to the supporting surface.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

FIG. 3 is a cross-sectional view taken along line 3—3 of FIG. 2, showing the magnetic mounting surface.

FIG. 6 is an exploded perspective view, partially in cross section, showing installation of the jack nut in a mounting hole provided in the sheet metal of the automobile.

FIG. 7 is a diagrammatic view of the jack nut being tightened during installation.

FIG. 8 is an exploded perspective view showing the relative positioning of the jack nut, the base assembly, the internal tensioning members contained therein, and the magnetic mounting plate.

FIG. 9 is a diagrammatic perspective view of the base assembly being installed on an automobile surface.

FIG. 10 is a diagrammatic perspective view of the magnetic base assembly being rotated in order to tension the internal tensioning members.

DESCRIPTION OF THE PREFERRED EMBODIMENT

Figure 1:
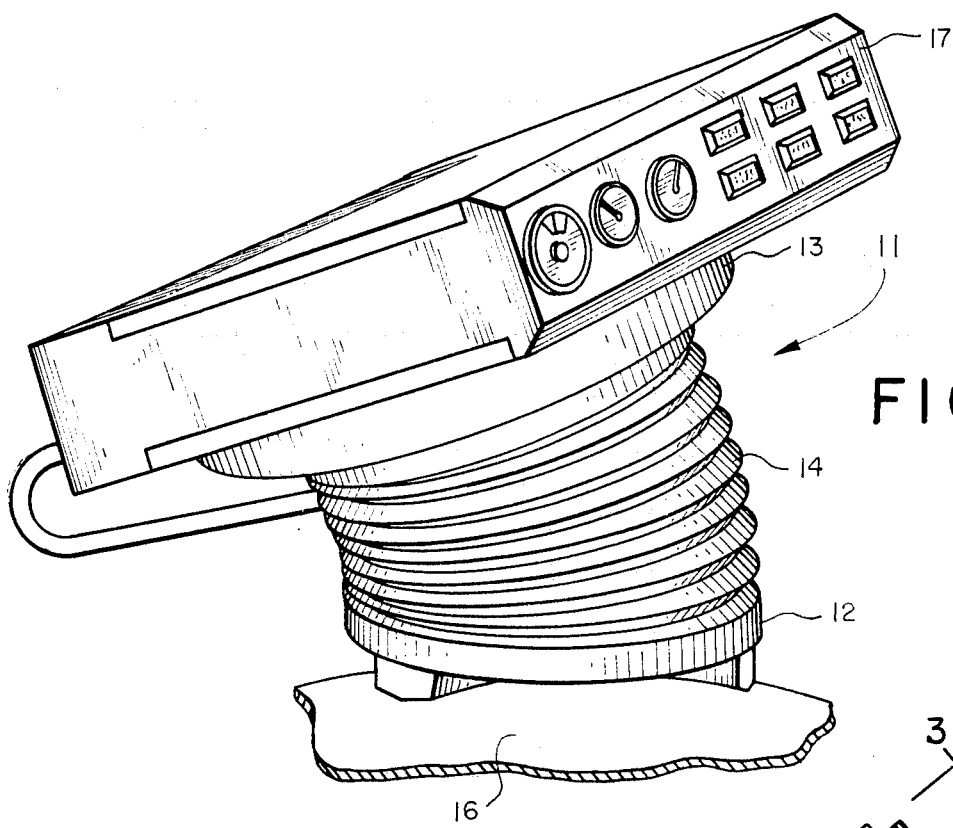
FIG. 1 is a perspective view of a mounting device constructed in accordance with the invention for mounting electronic equipment to a surface.

Referring to the figures, and particularly to FIG. 1, a swivel base assembly constructed in accordance with the invention is indicated generally at 11 and is seen to include a universal base 12, a magnetic mounting disk 13, and a housing sleeve 14. The universal base 12 is shown positioned on a mounting surface 16 which may be the transmission hump or floor of an automobile passenger compartment. A radio unit 17 is shown attached to the magnetic mounting disk 13 and illustrates the manner in which the swivel base assembly can be used to mount a two-way radio or similar electronic unit to a suitable mounting surface.

Figure 2:
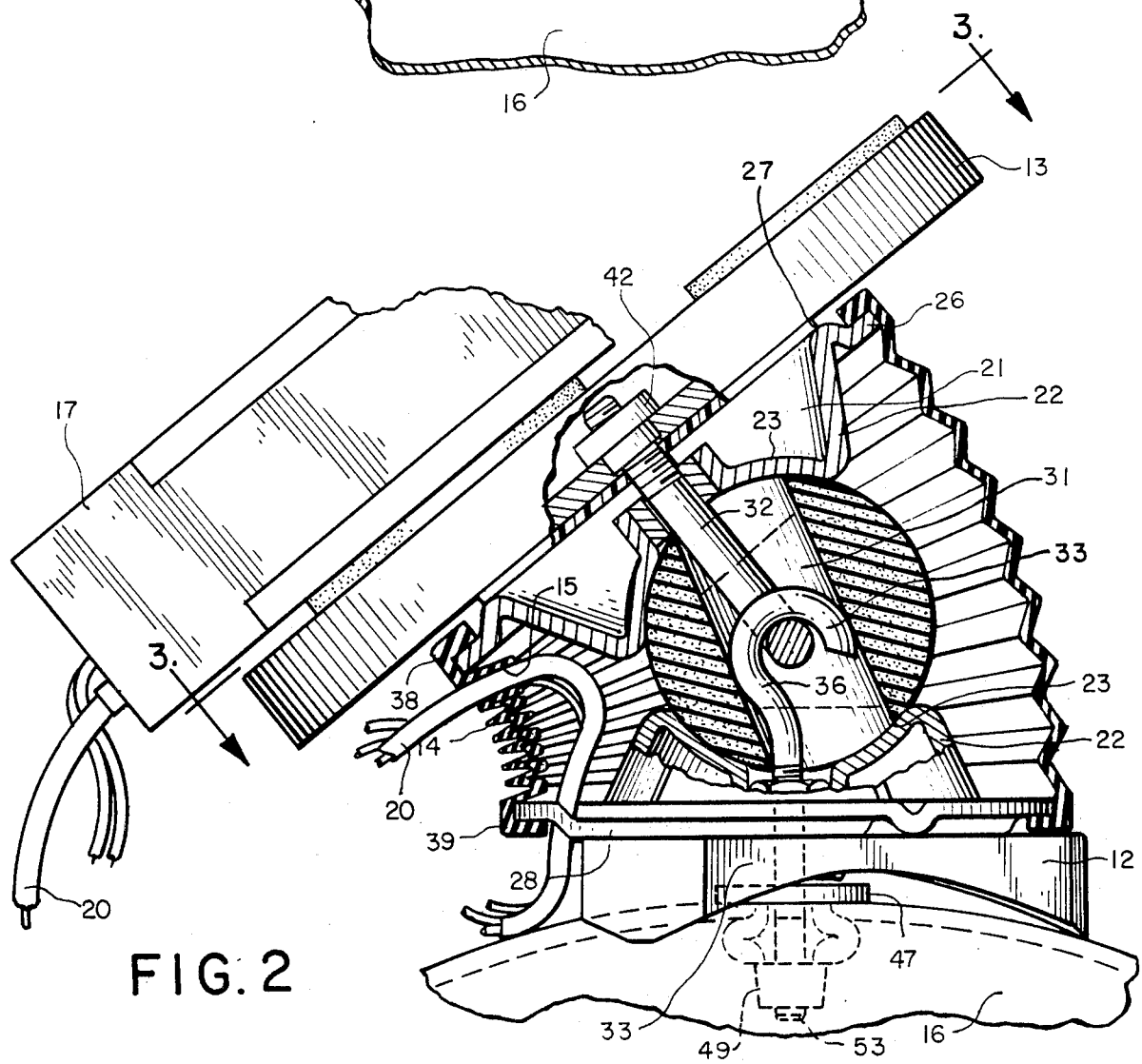
FIG. 2 is a partial cross-sectional view of the device illustrated in FIG. 1 showing the internal construction of the mounting mechanism.
Figure 4:
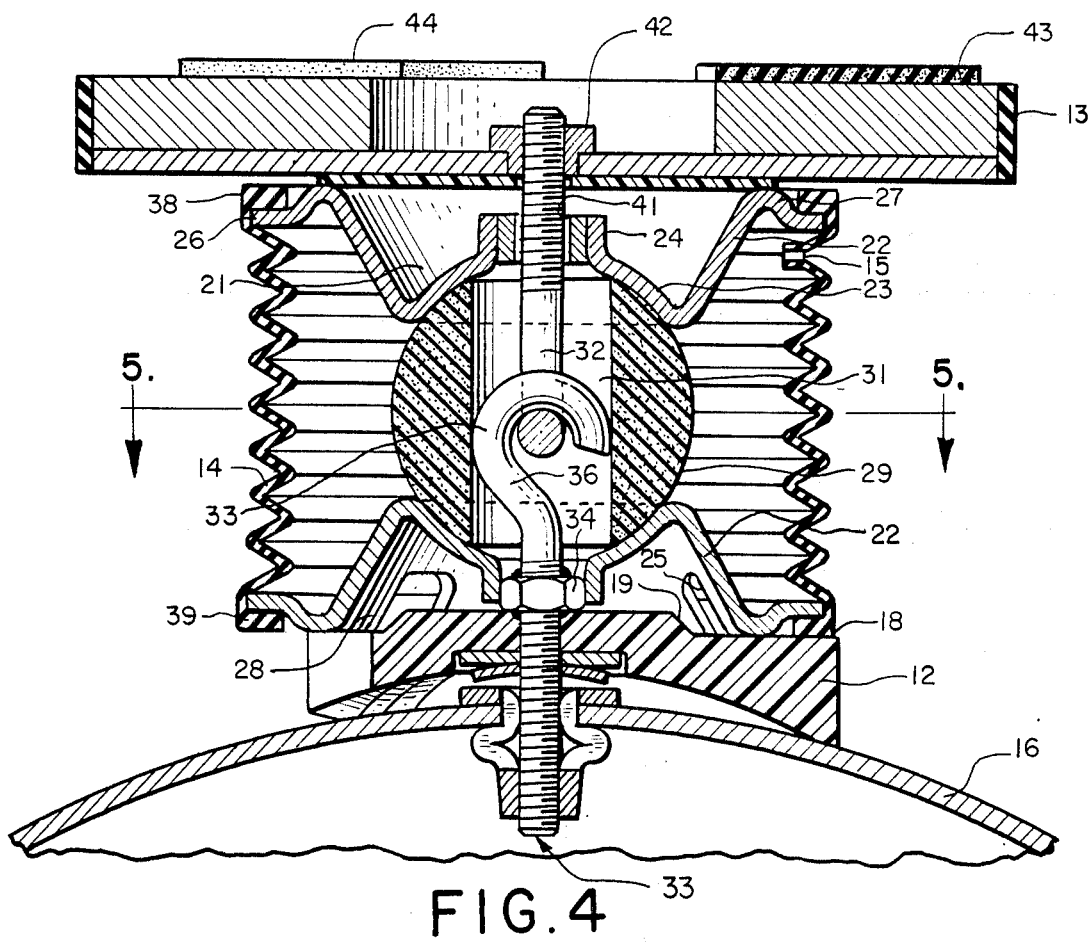
FIG. 4 is a cross-sectional view of the device mounted in place on the sheet metal of an automobile transmission hump.
Figure 5:
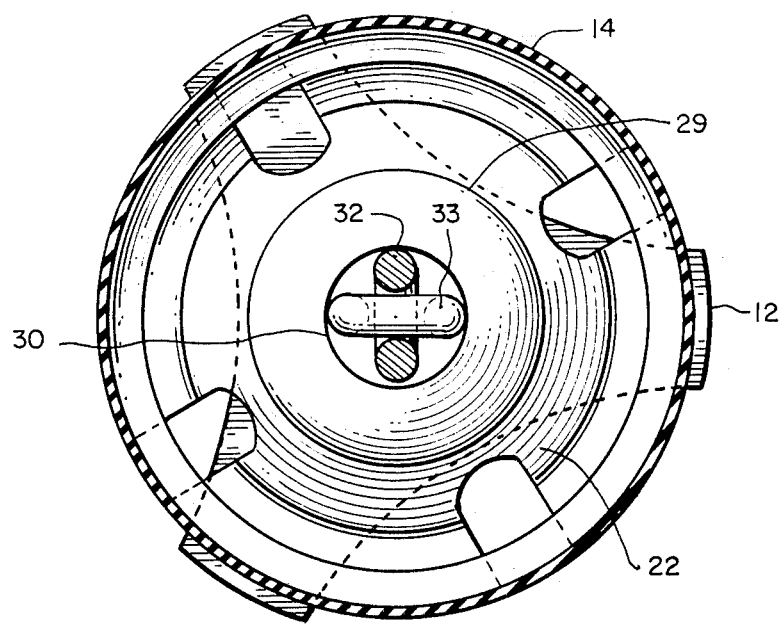
FIG. 5 is a cross-sectional view of the mounting device taken along line 5—5 of FIG. 4.

FIGS. 2 and 4 show in greater detail the internal construction of the swivel base assembly. The universal base 12 is generally Y-shaped, as indicated in FIG. 5, and is molded of durable plastic or similar material. The base 12 is seen to include three arms extending radially outward from the center of the base unit, each arm being separated from the others by 120° of arc. The under surface of the universal base is curved so that each arm is substantially thicker at its extreme outer edge than it is toward the center of the base. The upper surface 18 of the universal base 12 is substantially flat, and has a raised portion 19 toward the center of the unit.

Because the under surface of each arm of the universal base 12 is curved, and has its greatest thickness at the extreme outer edge, a universal base placed against a surface, such as an automobile hump, will contact the surface at three points, each corresponding to the extreme outer edge of a mounting arm. Since the universal base 12 is designed to engage most mounting surfaces with only three points of contact, the base may be securely affixed to a variety of curved or flat mounting surfaces. FIGS. 2 and 4 show in greater detail the manner in which the universal mounting base contacts the mounting surface 16 to which it is attached.

The swivel base assembly 11 includes an upper plate 21 which is generally disk-shaped in form. A conical frustrum 22 extends upward from the center of the plate and is provided along its upper surface with a concave depression 23 of generally spherical form. The center of this depression is provided with an aperture extending through an integrally formed tube 24 projecting from the under surface of the plate 21. The periphery of the plate 21 is displaced upwardly, forming a flange 26 extending around the upper plate, and further forming an annular bearing surface 27 in the under surface of the upper plate. This configuration allows the upper plate to be easily and economically stamped from sheet steel or similar such material. The lower plate 28 is of similar configuration, and in fact may be identical to the upper plate 21, resulting in greater simplicity and manufacturing economy.

A pivot ball 29 formed of hard rubber, or similar resilient yet deformable material, is disposed between the plates 21 and 28. A circular aperture 31 extends diametrically through the center of the pivot ball 29. The swivel base assembly is provided with an internal tensioning member in the form of two eye bolts 32 and 33 each having a hook at one end, dimensioned so as to be received within aperture 31 of pivot ball 29. A machine nut 34 is fixedly attached to the threaded portion of the eye bolt 33 adjacent the unthreaded hook portion 36 so that movement of the machine nut relative to the eye bolt is precluded. The machine nut is securely received in a suitably dimensioned aperture provided in the center of plate 28 and prevents relative rotation of the eye bolt with respect to the lower plate 28. Similarly, any rotation of the lower plate 28, will result in rotation of the eye bolt 33 attached thereto. The threaded portion of eye bolt 33 extends beyond the bottom surface of the lower plate 28, and passes through a suitably dimensioned aperture provided in the center of the universal base 12. The portion of the eye bolt extending through the lower plate 28 and the universal base 12 engages jack nut 47. The jack nut has been installed in the surface 16 on which the mounting unit is to be placed in a manner to be described shortly. The relative position of the eye bolt 33, the machine nut 34, the lower plate 28, the universal base 12, the jack nut 47, and mounting surface 16 are shown in FIG. 4.

FIG. 4 also shows the relative positions of the pivot ball 29, the upper plate 21 and the housing sleeve 14. The similarly constructed upper plate 21 is disposed in an inverted position over the lower plate 28 so that the concave spherical surfaces provided in each plate face one another. The spherical pivot ball 29 is disposed between the upper and lower plates 21 and 28, and is dimensioned so as to intimately engage the concave spherical surfaces provided in the plates.

The housing sleeve 14 is generally tubular in form and is fashioned from a flexible material such as rubber or flexible plastic. The housing sleeve 14 is provided with corrugations so that the linear dimension of the sleeve may be varied over a range. The corrugations provided in the housing sleeve also allow the sleeve to flex in a number of directions as indicated in FIG. 2. Each end of the sleeve 38 and 39 is provided with a lip which engages the suitably dimensioned flange provided along the periphery of each of the plates 21 and 28. FIGS. 2 and 4 show the housing sleeve 14 in place on a swivel base assembly 11. The sleeve 14 serves to shield the internal mechanism of the assembly from dust and grime, and further provides an aesthetically pleasing outward appearance so as not to interfere with the decor of the automobile. As can be seen in FIG. 4, eye bolt 33 is positioned so that the hook portion is received within the aperture provided in the pivot ball 29. The second eye bolt 32 is disposed within the aperture and with its hook portion engaging the hook portion of eye bolt 33. Eye bolt 32 passes upward through a suitable aperture 41 provided in the upper plate 21, and extends beyond the top surface of upper plate 21. FIG. 5 shows the relative positioning of the engaged hook portions of eye bolts 32 and 33.

Attaching means for attaching the radio or other electronic unit to the swivel base assembly are provided in the form of a mounting platform, which in this embodiment comprises a generally circular magnetic mounting disk 13. As can be seen in FIG. 4, the under surface of the mounting disk 13 is provided with a raised portion centered about the axis of the mounting disk and dimensioned so as to contact the annular rim 27 formed in the upper mounting plate. The center of the mounting disk 13 is provided with a threaded collar 42 suitable for engaging the threaded portion of eye bolt 32. FIG. 3 shows the upper surface of the mounting disk 13, which is seen to include three generally sector-shaped pods 43, 44 and 45 each directed radially inward, spaced equally, circumferentially about the center of the disk. The pods serve to hold the electronic unit somewhat above the magnetic surface provided in the mounting disk 13 so that sound emanating from radio units having bottom-mounted speakers will not be substantially attenuated by the mounting disk. The mounting disk 13 is provided with a magnetic upper surface. Magnetic objects, including the metallic housing of most radios or other electronic units, will be attracted to the upper surface of the mounting disk and held firmly thereon by reason of the strong attractive magnetic forces generated by the magnetized portion of the mounting disk 13. The pods 43, 44 and 45 are fashioned from a material having a high coefficient of friction, such as rubber or cork, and help to prevent slippage of a unit held magnetically to the mounting disk.

Because the magnetic mounting disk 13 contacts the annular bearing surface 27 formed in the upper plate, the mounting disk may freely rotate relative to the upper plate. As the mounting disk is rotated with respect to the upper plate 21, the eye bolt engaged by the threaded collar 42 provided in the mounting disk 13 is drawn upward or driven downward depending upon the direction of rotation of the mounting disk. If the mounting disk is rotated in the direction shown in FIG. 10, the eye bolt 32 is drawn upward, which has the effect of increasing tension between the upper and lower eye bolts 32 and 33, respectively. The increased tension is transferred, by reason of the contact between the mounting disk 13 and the upper plate 21, to the upper plate which in turn provides a compressive force against the pivot ball 29.

FIGS. 6–10 show the manner in which the swivel base assembly 11 is mounted on a suitable mounting surface 16. A properly dimensioned hole is first bored in the surface 16 as shown in FIG. 6. A jack nut 47 having an upper disk portion 48 and a lower disk portion 49 in parallel spaced arrangement connected by two deformable locking arms 51 and 52 is then inserted through the aperture 46. Both the upper and lower disks 48 and 49 are provided with the circular apertures having a common axis. The lower aperture is threaded and suitably dimensioned so as to engage the threaded portion of the bolt 53 indicated in FIG. 6. The aperture in the upper disk 48 is of sufficient diameter so that both the threaded and unthreaded portions of the bolt 53 may freely slide therethrough. A standoff 54, fashioned of metal and hexagonal in cross section, is utilized during installation of the jack nut 47. A circular aperture 56 is bored along the linear axis of the standoff and is of sufficient diameter so that the bolt may rotate freely within. The outer dimensions of the standoff are such that it may be gripped by a wrench 57 of standard dimension as shown in FIG. 7. The under surface of the standoff 54 is provided with a recess 58 suitably dimensioned so as to receive the upper disk portion 48 of the jack nut 47. The recess is provided with blocking surfaces so that relative rotation of the jack nut with respect to the standoff 54 is precluded. The diameter of the aperture 46 bored in mounting surface 16 is great enough so that both the lower disk portion 49 and the deformable locking arms 51, 52 of the uninstalled jack nut 47 may pass therethrough, but is of sufficiently small diameter so that the upper disk portion 48 of the jack nut may not pass through the aperture, and instead bears against the mounting surface.

In order to install the jack nut on a mounting surface, the unextended jack nut 47 is first introduced into the aperture provided in the mounting surface. The standoff 54 is then positioned over the jack nut and engages the nut preventing rotation with respect to the standoff. Bolt 53 is then introduced through the circular aperture provided in the standoff and engages the threaded lower disk portion 49 of the jack nut. The standoff is held firmly with a suitably dimensioned wrench 57, while the bolt is turned with another suitably dimensioned wrench 59 as shown in FIG. 7. Linear travel of the bolt is prevented by reason of the under surface of the bolt head coming into contact with the upper surface of the standoff. Since the jack nut 47 is precluded from rotation by reason of the standoff being held in position with wrench 57, rotation of the bolt head results in relative rotation of the threaded portion of the bolt 53 with respect to the lower disk 49. As the bolt is rotated the lower disk portion of the jack nut is drawn upward, which results in the deformable arms 51 and 52 folding over themselves, and extending laterally along the underside of mounting surface 16. Eventually the lower disk 49 will be drawn tightly against the under surface of the mounting surface. At this point the deformable arms 51 and 52 will have been extended fully and will thus prevent travel of the jack nut 47 through the aperture 46 provided in the mounting surface. The mounting bolt 53 may now be removed by rotation in the opposite direction and the standoff may thereafter be lifted away, leaving the jack nut firmly attached to the mounting surface. The threaded disk provided in the jack nut, may then be engaged by any other suitably dimensioned threaded member introduced into it.

Once the jack nut has been installed in the transmission hump or floor of an automobile, the swivel base assembly can be mounted by introducing the threaded portion of eye bolt 33 into the jack nut 47. The threads provided in the jack nut and on both the mounting bolt 53, and the eye bolt 33, are similar. FIGS. 8 and 9 show installation of the base portion of the swivel base assembly. The universal base 12 together with the upper and lower plates 21 and 28, and the housing sleeve 14, is rotated in a direction indicated by the arrow in FIG. 9. The pivot ball 29 and the upper eye bolt 32 are contained within the housing sleeve 14, and the threaded portion of the upper eye bolt 32 may be seen extending through the top surface of the upper plate. As the base portion of the swivel base is rotated, the lower eye bolt 33 is also rotated by reason of its being fixedly attached to lower plate 28 as described earlier, and as shown in FIG. 4. As the base portion is rotated in the direction shown in FIG. 9, the universal base 12 is drawn downward against the mounting surface. Because the universal base 12 and the lower disk are rotatable relative to one another, the mounting base may be held in position on the transmission hump, while the lower disk together with the lower eye bolt 33 is rotated to increase the downward force against the universal base. The lower disk 28 is rotated until the downward force exerted on universal base 12 is sufficient to hold both the universal mounting base and the base portion of the swivel base assembly firmly against the mounting surface. It will be appreciated that by reason of the design of the universal base, the base may be installed directly over the carpeting which is frequently installed in most automobiles. Furthermore, by reason of the three contact points presented by the universal base, the base may be firmly installed on a variety of surfaces each having different shapes and degrees of curvature.

Once the base portion of the swivel base assembly has been installed on the transmission hump, the magnetic mounting disk may then be installed as shown in FIGS. 8 and 10. The mounting disk is placed over the base portion so that the threaded portion of the upper eye bolt 32 is engaged by the threaded collar 42 provided at the center of the magnetic mounting disk 13. As the disk 13 is rotated in the direction shown in FIG. 10, the upper eye bolt 32 is drawn upward as shown in FIG. 4, increasing the tension on both upper and lower eye bolts 32 and 33, respectively.

The increased tension results in compressive force against the pivot ball 29, which results in partial deformation of the pivot ball, and substantial friction between the pivot ball and the spherical surfaces of upper and lower plates 21 and 28. The lower eye bolt 33 is kept from rotating by reason of its being firmly attached to the lower plate 28. The upper bolt 32 is prevented from rotating by reason of its engaging the hook portion of the lower eye bolt. The two eye bolts may rotate with respect to one another over only a limited arc as illustrated in FIG. 5. While axial rotation of the two eye bolts with respect to one another is limited, the eye bolts may swivel with respect to one another over a wide range as is illustrated in FIG. 2. The limits of rotation are defined by the points at which an edge of the aperture through the pivot ball 29 comes into contact with the shank portion of both of the eye bolts 32 and 33 as shown in FIG. 2.

When the eye bolts are not under tension, a condition which may be achieved by rotating the mounting disk 13 in the direction opposite that shown by the arrow in FIG. 10, the swivel base assembly can be positioned to a wide variety of positions, such as the one shown in FIG. 2. The housing sleeve 14, by reason of the flexibility imparted through the corrugations it contains, is able to adapt itself to the wide variety of positions provided by the swivel base assembly. Once the swivel base assembly has been brought to the position desired, it is held in that position while the mounting disk 13 is rotated in the direction indicated by the arrow of FIG. 10. This results in increased tension in eye bolts 32 and 33 and compression of the pivot ball 29.

Once the swivel base assembly has been installed in an automobile and locked into a desired position, the two-way radio or other electronic unit, such as that indicated by 17 in FIG. 1, can be placed on the upper surface of mounting disk 13, where it will be firmly held to the disk by reason of the magnetic surface provided thereon. It will be appreciated that since the surface of the mounting disk 13 is flat, the radio may be placed on the mounting disk in any position within 360° rotation about the center of the disk. This additional freedom of movement results in even greater variety of positions available through use of the swivel base assembly.

While in this embodiment the internal tensioning member comprises two eye bolts arranged for rotation in two planes, it will be appreciated that a variety of other tensioning systems may be utilized in conjunction with the swivel base assembly. A cable or chain may be used in place of the two eye bolts used in the preferred embodiment, but a cable so utilized would tend to twist and weaken whereas the eye bolt arrangement is able to withstand a greater torque imparted through rotation of the mounting plate, and thus results in a stronger and more longlasting base assembly.

It will be further appreciated that applicants' system is also adapted to uses wherein the universal mounting base may be of a different configuration than the Y-shaped configuration shown in this preferred embodiment.

Because the electronic equipment is held to the mounting plate 13 solely by reason of the attractive magnetic forces, and thus is not mechanically latched or locked to the mounting plate, it will be seen that the radio is easily removed and installed on the magnetic mounting plate. This results in simple and quick removal and installation of the electronic unit which is a desirable feature in a mounting assembly.

It will further be appreciated that since the mounting assembly is attached to the automobile through use of a single jack nut, which fits flush in only one hole drilled in the automobile sheet metal, that the base assembly may be removed from an automobile leaving little evidence, other than the single jack nut, that the base unit was ever installed in the automobile.

The flexible housing sleeve 14 is provided with an aperture 15 in the form of an elongated horizontal slit along a portion of the trough of the uppermost corrugation. Aperture 15 allows the electrical cables 20 such as the power leads and the antenna transmission line extending from the rear panel of the radio unit 17 to be routed into the interior of the sleeve, as illustrated in FIG. 2. The cables 20 then pass through aperture 25 provided in lower plate 28 to exit the mounting base assembly near its lower end. Once clear of the mounting base, the cables are connected in known manner to the vehicle's electrical system. Since the cables are largely hidden from view, this arrangement provides for an aesthetically pleasing installation of the radio apparatus.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. A swivel base assembly for mounting electronic apparatus or the like on a supporting surface, comprising:

a deformable spacer element; of generally spherical exterior a first plate adapted to engage having a surface mating with the exterior said spacer element from one side thereof and being angularly adjustable therewith, said first plate including means for receiving said apparatus in supporting relationship;

a second plate adapted to engage said spacer element from the other side thereof and being angularly adjustable therewith, said second plate including means for attachment to said supporting surface;

retaining means for retaining said first and second plates in operative engagement with said spacer element whereby said plates are movable with respect to each other; an apparatus supporting means carried by said retaining means and disposed above said first plate locking means including rotatable, axial adjusting means on said apparatus supporting means cooperating with said retaining means, said adjusting means being responsive to rotation of said apparatus supporting means relative to said second plates for drawing said first and second plates into compressive engagement with said spacer element upon rotation of said apparatus supporting means in a predetermined direction, and for releasing said first and second plates from said compressive engagement with said spacer element upon rotation of said apparatus supporting means; first plate in the opposite direction whereby said plates are fixedly positioned relative to each other and to said supporting surface when said first and second plates compressively engage said spacer element.

2. A swivel base assembly as defined in claim 1 wherein said retaining means extend through said spacer element.

3. A swivel base assembly as defined in claim 1 wherein said locking means comprise means for shortening the effective length of said retaining means.

4. A swivel base assembly as defined in claim 2 wherein said retaining means includes two eye bolts flexibly coupled to each other at their eyes.

5. A swivel base assembly as defined in claim 1 wherein said apparatus supporting means defines
   a mounting platform rotatably attached to said having; magnetic means thereon said mounting platform for magnetically retaining the electronic apparatus on said mounting platform.

6. A swivel base assembly as defined in claim 5 further comprising a flexible hollow sleeve extending between the ends of said flexible base.

7. A swivel base assembly as defined in claim 1 wherein said sleeve comprising a generally cylindrical corrugated flexible tube.

8. A swivel base assembly as defined in claim 1 wherein said sleeve includes an aperture for communicating electrical cables from the exterior of said sleeve to the interior of said sleeve.

* * * * *